United States Patent
Chen et al.

(10) Patent No.: US 10,939,383 B2
(45) Date of Patent: Mar. 2, 2021

(54) POWER CONTROL METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/535,688

(22) Filed: Aug. 8, 2019

(65) Prior Publication Data

US 2019/0364511 A1 Nov. 28, 2019

Related U.S. Application Data

(63) Continuation of application No. PCT/CN2018/073518, filed on Jan. 19, 2018.

(51) Int. Cl.
*H04W 52/08* (2009.01)
*H04W 52/24* (2009.01)
(Continued)

(52) U.S. Cl.
CPC ......... *H04W 52/08* (2013.01); *H04L 27/0014* (2013.01); *H04W 52/10* (2013.01); *H04W 52/242* (2013.01); *H04L 2027/0053* (2013.01)

(58) Field of Classification Search
CPC ................................................ H04W 52/00–60
See application file for complete search history.

(56) References Cited

U.S. PATENT DOCUMENTS 9,072,055 B2 6/2015 Jöngren
10,004,043 B2 6/2018 Lee et al.
(Continued)

FOREIGN PATENT DOCUMENTS

CN 103037489 A 4/2013
CN 105307254 A 2/2016
(Continued)

OTHER PUBLICATIONS

International Search in international application No. PCT/CN2018/073518, dated Oct. 11, 2018.
(Continued)

*Primary Examiner* — Raymond S Dean

(57) ABSTRACT

A power control method, a terminal device and a network device are provided. The method includes: a terminal device resets a first closed loop adjustment factor associated with first Sounding Reference Signal Resource Indicator (SRI) information in condition that a first open loop power control parameter associated with the first SRI information or a first downlink Reference Signal (RS) associated with the first SRI information is reconfigured, the first open loop power control parameter being configured for power control of a Physical Uplink Shared Channel (PUSCH) and the first downlink RS being configured to measure a path loss value for power control of over the PUSCH; and the terminal device determines transmit power of the PUSCH according to the reset first closed loop adjustment factor.

14 Claims, 3 Drawing Sheets

(51) Int. Cl.
*H04L 27/00* (2006.01)
*H04W 52/10* (2009.01)

(56) References Cited

U.S. PATENT DOCUMENTS

| | | | |
|---|---|---|---|
| 2012/0329503 A1 | 12/2012 | Joengren | |
| 2013/0310102 A1* | 11/2013 | Chao | H04W 52/146 455/522 |
| 2016/0037453 A1 | 2/2016 | Sivanadyan et al. | |
| 2016/0135128 A1 | 5/2016 | Lee et al. | |
| 2016/0242125 A1* | 8/2016 | Lee | H04W 52/246 |
| 2018/0013533 A1 | 1/2018 | Yang et al. | |
| 2019/0132824 A1* | 5/2019 | Jeon | H04L 5/00 |
| 2019/0190669 A1* | 6/2019 | Park | H04W 56/001 |
| 2019/0190747 A1* | 6/2019 | Park | H04L 5/005 |
| 2019/0289513 A1* | 9/2019 | Jeon | H04W 52/40 |

FOREIGN PATENT DOCUMENTS

| | | |
|---|---|---|
| CN | 105309017 A | 2/2016 |
| CN | 107113150 A | 8/2017 |
| CN | 108134659 A | 6/2018 |
| EP | 3247163 A1 | 11/2017 |
| WO | 2016144879 A1 | 9/2016 |

OTHER PUBLICATIONS

Written Opinion of the International Search Authority in international application No. PCT/CN2018/073518, dated Oct. 11, 2018.
ZTE, Sanechips,Offline summary of UL power control—non-CA aspects, 3GPP TSG RAN WG1 Meeting #91 Reno, USA, Nov. 27-Dec. 1, 2017. R1-1721457.
Supplementary European Search Report in the European application No. 18901012.7, dated Feb. 11, 2020.
International Search Report in the international application No. PCT/CN2018/073518, dated Oct. 11, 2018.
Written Opinion of the International Search Authority in the international application No. PCT/CN2018/073518, dated Oct. 11, 2018.
First Office Action of the Chinese application No. 201911295963.8, dated Nov. 2, 2020.
First Office Action of the Indian application No. 201917032298, dated Sep. 28, 2020.
First Office Action of the Canadian application No. 3055624, dated Oct. 23, 2020.

* cited by examiner

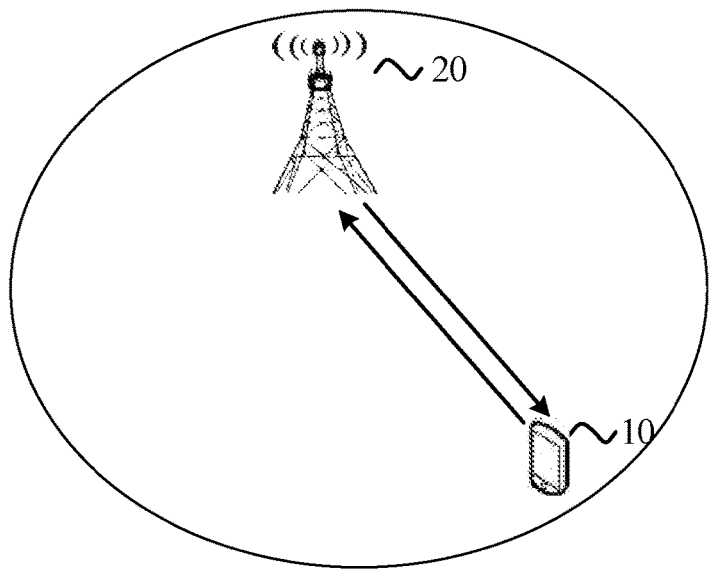

A terminal device resets a first closed loop adjustment factor associated with first SRI information in condition that a first open loop power control parameter associated with the first SRI information or a first downlink RS associated with the first SRI information is reconfigured, the first open loop power control parameter being configured for power control of a PUSCH and the first downlink RS being configured to measure a path loss value for power control of the PUSCH ~S210

The terminal device determines transmit power of the PUSCH according to the reset first closed loop adjustment factor ~S220

FIG. 2

POWER CONTROL METHOD, TERMINAL DEVICE AND NETWORK DEVICE

CROSS-REFERENCE TO RELATED APPLICATION

This is a continuation application of International Patent Application No. PCT/CN2018/073518, filed on Jan. 19, 2018, the disclosure of which is incorporated by reference herein in its entirety.

TECHNICAL FIELD

The disclosure relates to the field of communication, and more particularly to a power control method, a terminal device and a network device.

BACKGROUND

In a New Radio (NR) system, a terminal device may have multiple panels for uplink transmission. A panel includes a group of physical antennae, and each panel may have an independent radio frequency channel. The terminal device may simultaneously transmit data on the multiple panels. However, different panels correspond to different channel conditions, and thus different transmission parameters, for example, transmit power, are required to be adopted for different panels according to respective channel information. For obtaining these transmission parameters, different Sounding Reference Signal (SRS) resources are required to be configured for different panels. For example, a panel may correspond to an SRS resource set, and a network side may indicate the SRS resource set through an SRS Resource Indicator (SRI). Each SRI information corresponds to a group of power control parameters or downlink Reference Signals (RSs). The terminal device may perform power control of a Physical Uplink Shared Channel (PUSCH) according to the power control parameter or downlink RS corresponding to the SRI. However, when the power control parameter or downlink RS corresponding to the SRI information is reconfigured, the problem urgent to be solved is how to control transmit power of the PUSCH to improve the accuracy of the power control.

SUMMARY

The embodiments of the disclosure provide a power control method, a terminal device and a network device, which are capable for improving the accuracy of the power control.

According to a first aspect, the disclosure provides a power control method, The method may include the following operations. A terminal device resets a first closed loop adjustment factor associated with first SRI information in condition that a first open loop power control parameter associated with the first SRI information or a first downlink RS associated with the first SRI information is reconfigured. The first open loop power control parameter is configured for power control of a PUSCH and the first downlink RS is configured to measure a path loss value for power control of the PUSCH. The terminal device determines transmit power of the PUSCH according to the reset first closed loop adjustment factor.

In such a manner, when the first open loop power control parameter or first downlink RS corresponding to the first SRI information is reconfigured, the terminal device may reset the first closed loop adjustment factor corresponding to the first SRI information and re-perform closed loop accumulation adjustment on the transmit power. Therefore, power control may be performed according to the reset first closed loop adjustment factor, and the accuracy of the power control may further be improved.

In some possible implementation modes, the first SRI information may be included in Downlink Control Information (DCI) configured to schedule the PUSCH.

In some possible implementation modes, the method may further include the following operation.

The terminal device receives first high-layer signaling sent by a network device. The first high-layer signaling is configured to configure open loop power control parameters or indexes of downlink RSs associated with a plurality of SRI information. The plurality of SRI information includes the first SRI information, the open loop power control parameters include the first open loop power control parameter and the indexes of the downlink RSs include an index of the first downlink RS.

In some possible implementation modes, the method may further include the following operations.

The terminal device receives second high-layer signaling sent by the network device. The second high-layer signaling is configured to configure open loop power control parameters or indexes of downlink RSs corresponding to a plurality of SRI information on each Bandwidth Part (BWP) of the terminal device.

The terminal device determines the first open loop power control parameter associated with the first SRI information or the first downlink RS associated with the first SRI information according to a correspondence on a BWP transmitting the PUSCH.

In some possible implementation modes, the first open loop power control parameter may be objective received power or a path loss factor.

In some possible implementation modes, the first downlink RS may be a downlink Synchronous Signal Block (SSB) or a Channel State Information-Reference Signal (CSI-RS).

In some possible implementation modes, the method may further include the following operation.

The terminal device determines the first closed loop adjustment factor in a closed loop control process associated with the first SRI information according to the closed loop power control process.

In some possible implementation modes, the operation that the first closed loop adjustment factor associated with the first SRI information is reset may include the following action.

In condition that an accumulation mode is enabled for closed loop power control of the PUSCH, the terminal device resets the first closed loop adjustment factor.

In some possible implementation modes, the operation that the terminal device determines the transmit power of the PUSCH according to the reset first closed loop adjustment factor may include the following actions.

The terminal device determines an updated first closed loop adjustment factor according to the reset first closed loop adjustment factor and a latest received Transmit Power Control (TPC) command.

The terminal device determines the transmit power of the PUSCH according to the updated first closed loop adjustment factor.

In some possible implementation modes, the method may further include the following operation. The terminal device sends the PUSCH according to the determined transmit power.

According to a second aspect, the disclosure provides a power control method. The method may include the following operations.

A network device resets a first closed loop adjustment factor associated with first SRI information after a first open loop power control parameter associated with the first SRI information or a first downlink RS associated with the first SRI information is reconfigured. The first open loop power control parameter is configured for power control of a PUSCH and the first downlink RS is configured to measure a path loss value for power control of the PUSCH.

In some possible implementation modes, the first SRI information may be included in DCI configured to schedule the PUSCH.

In some possible implementation modes, the method may further include the following operation.

The network device sends first high-layer signaling to a terminal device. The first high-layer signaling is configured to configure open loop power control parameters or indexes of downlink RSs associated with a plurality of SRI information. The plurality of SRI information includes the first SRI information, the open loop power control parameters include the first open loop power control parameter and the indexes of the downlink RSs include an index of the first downlink RS.

In some possible implementation modes, the method may further include the following operation.

The network device sends second high-layer signaling to the terminal device. The second high-layer signaling is configured to configure open loop power control parameters or indexes of downlink RSs corresponding to a plurality of SRI information on each BWP of the terminal device.

In some possible implementation modes, the first open loop power control parameter may be objective received power or a path loss factor.

In some possible implementation modes, the first downlink RS may be a downlink Synchronization Signal Block (SSB) or a Channel State Information RS (CSI-RS).

In some possible implementation modes, the method may further include the following operation.

The network device determines the first closed loop adjustment factor in a closed loop control process associated with the first SRI information according to the closed loop power control process.

In some possible implementation modes, the operation that the network device resets the first closed loop adjustment factor associated with the first SRI information may include the following action.

In condition that an accumulation mode is enabled for closed loop power control of the PUSCH, the network device resets the first closed loop adjustment factor.

In some possible implementation modes, the method may further include the following operation.

The network device determines a subsequent TPC command according to the reset first closed loop adjustment factor.

According to a third aspect, the disclosure provides a terminal device, which is configured to execute the method in the first aspect or any possible implementation mode of the first aspect. Specifically, the terminal device includes units configured to execute the method in the first aspect or any possible implementation mode of the first aspect.

According to a fourth aspect, the disclosure provides a network device, which is configured to execute the method in the second aspect or any possible implementation mode of the second aspect. Specifically, the network device includes units configured to execute the method in the second aspect or any possible implementation mode of the second aspect.

According to a fifth aspect, the disclosure provides a terminal device, which includes a memory, a processor, an input interface and an output interface. The memory, the processor, the input interface and the output interface are connected through a bus system. The memory is configured to store an instruction. The processor is configured to execute the instruction stored in the memory to execute the method in the first aspect or any possible implementation mode of the first aspect.

According to a sixth aspect, the disclosure provides a network device, which includes a memory, a processor, an input interface and an output interface. The memory, the processor, the input interface and the output interface are connected through a bus system. The memory is configured to store an instruction. The processor is configured to execute the instruction stored in the memory to execute the method in the second aspect or any possible implementation mode of the second aspect.

According to a seventh aspect, the disclosure provides a computer storage medium, The computer storage medium is configured to store a computer software instruction for executing the method in the first aspect or any possible implementation mode of the first aspect or the method in the second aspect or any possible implementation mode of the second aspect and includes a program designed to execute the above aspects.

According to an eighth aspect, the disclosure provides a computer program product including an instruction. The computer program product, when operated on a computer, may enable the computer to execute the method in the first aspect or any optional implementation mode of the first aspect or the method in the second aspect or any optional implementation mode of the second aspect.

BRIEF DESCRIPTION OF DRAWINGS

FIG. 1 is a schematic diagram of an application scenario according to an embodiment of the disclosure.

FIG. 2 is a schematic flowchart of a power control method according to an embodiment of the disclosure.

DETAILED DESCRIPTION

Figure 3:
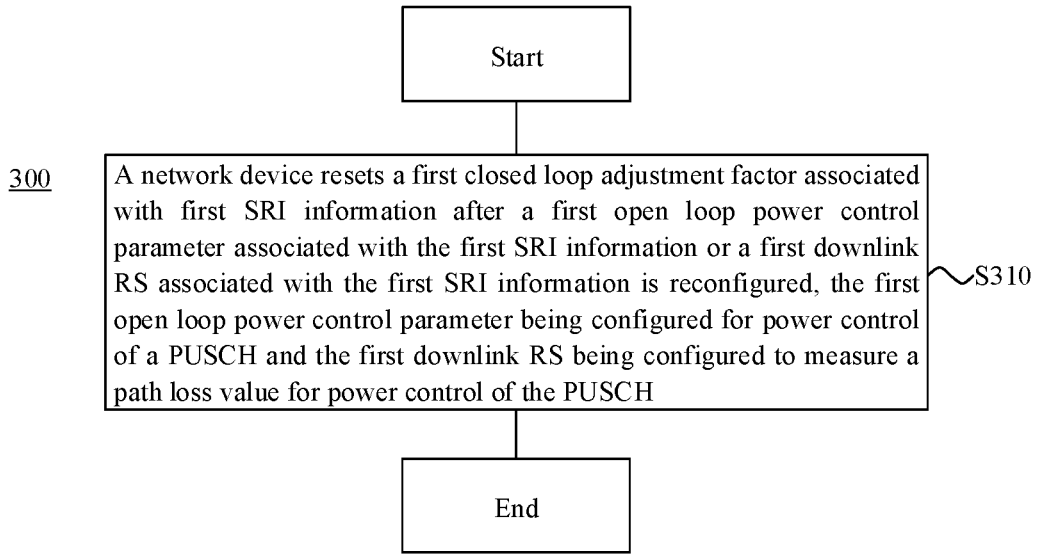
FIG. 3 is another schematic flowchart of a power control method according to an embodiment of the disclosure.

The technical solutions in the embodiments of the disclosure will be described below in combination with the drawings in the embodiments of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, NR or a future 5th-Generation (5G) system.

Particularly, the technical solutions of the embodiments of the disclosure may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the disclosure may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, UE in a future 5G network, UE in a future evolved Public Land Mobile Network (PLMN) or the like. There are no limits made in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional NodeB (eNB or eNodeB) in the LTE system and may further be a wireless controller in a Cloud Radio Access Network (CRAN) scenario. Alternatively, the network device may be a relay station, an access point, a vehicle-mounted device, a wearable device, a network device in the future 5G network, a network device in the future evolved PLMN or the like. There are no limits made in the embodiments of the disclosure.

FIG. 1 is a schematic diagram of an application scenario according to an embodiment of the disclosure. A communication system in FIG. 1 may include a terminal device 10 and a network device 20. The network device 20 is configured to provide communication service for the terminal device 10 and access to a core network. The terminal device 10 searches a synchronization signal, broadcast signal and the like sent by the network device 20 to access the network, thereby communicating with the network. Arrows illustrated in FIG. 1 may represent uplink/downlink transmission implemented through a cellular link between the terminal device 10 and the network device 20.

In an NR system, a terminal may obtain power control parameters corresponding to uplink transmission according to an SRI or an SRS resource indicated by the SRI, so as to obtain transmit power for transmission of uplink data.

At present, transmit power of a PUSCH may be calculated according to the following formula:

$$P_{PUSCH,f,c}(i, j, q_d, l) = \min\left\{ \begin{array}{l} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{array} \right\}$$

where i is an index of PUSCH transmission, j is an index of an open loop power control parameter, $q_d$ is an index of an RS for path loss estimation, $M_{PUSCH,c}(i)$ is the number of Resource Blocks (RBs) occupied by the PUSCH, $P_{CMAX,f,c}(i)$ is maximum transmit power configured by a terminal device on a subframe i of a serving cell c, $P_{O\_PUSCH,f,c}(j)$ and $\alpha_{f,c}(j)$ are open loop power control parameters, $PL_{f,c}(q_d)$ is a path loss value, measured by the terminal device, from the serving cell c to the terminal device, $\Delta_{TF,f,c}(i)$ is a value determined by the terminal device according to a ratio of a bit number of the uplink data sent by the PUSCH to the number of resource elements in the PUSCH, $f_{f,c}(i,l)$ is a closed loop power control adjustment factor and is a value determined by the terminal device according to a power adjustment command for the PUSCH, and l is an index of a closed loop power control process.

FIG. 2 is a schematic flowchart of a power control method 200 according to an embodiment of the disclosure. As illustrated in FIG. 2, the method 200 includes the following operations.

In S210, a terminal device resets a first closed loop adjustment factor associated with first SRI information in condition that a first open loop power control parameter associated with the first SRI information or a first downlink RS associated with the first SRI information is reconfigured, the first open loop power control parameter being configured for power control of a PUSCH and the first downlink RS being configured to measure a path loss value for power control of the PUSCH.

In S220, the terminal device determines transmit power of the PUSCH according to the reset first closed loop adjustment factor.

In at least one embodiment of the disclosure, the first SRI information may be included in DCI for scheduling the PUSCH. For example, the first SRI information may be a value of an SRI indicated by an SRI indication field in the DCI. The first SRI information is associated with (or corresponds to) the first open loop power control parameter or the first downlink RS.

In at least one embodiment, DCI for scheduling another PUSCH may include second SRI information, and the second SRI information is associated with (or corresponds to) a second open loop power control parameter or a second downlink RS. That is, the first SRI information and the second SRI information correspond to independent uplink power control parameters or downlink RSs respectively.

In at least one embodiment, the first open loop power control parameter associated with the first SRI information is objective received power (corresponding to $\kappa_{O\_PUSCH,c}(j)$ in the formula) of a path loss factor (corresponding to $\alpha_c(j)$ in the formula), or another parameter for power control. There are no limits made thereto in the embodiment of the disclosure.

In at least one embodiment, the first downlink RS associated with the first SRI information may be a downlink Synchronous Signal Block (SSB) or a Channel State Information-Reference Signal (CSI-RS) or another RS for power control. There are no limits made thereto in the embodiment of the disclosure. Particularly, in the embodiment of the disclosure, the first downlink RS may be configured to measure the path loss value from a serving cell to the terminal device.

In at least one embodiment, a network device may pre-configure open loop power control parameters or indexes of downlink RSs corresponding to a plurality of SRI information for the terminal device through first high-layer signaling, and the plurality of SRI information includes the first SRI information. Therefore, the terminal device may determine the corresponding open loop power control parameter according to a value of the first SRI information and then obtain the corresponding transmit power based on these parameters. The terminal device may further determine an index of the corresponding objective downlink RS according to the value of the first SRI information and then perform downlink path loss measurement based on the objective downlink RS indicated by the index, thereby obtaining the path loss value for power control. That is, the network device may pre-configure for the terminal device a correspondence between the plurality of SRI information and the open loop power control parameters or between the plurality of SRI information and the indexes of the downlink RSs, so that the terminal device may determine the open loop power control parameter or index of the downlink RS corresponding to the present SRI information according to the value of the present SRI information in combination with the correspondence.

For example, the SRI indication field may be a 2 bit indication field. It is exemplarily but unlimitedly described that a value 00 of the 2 bit indication field corresponds to an open loop power control parameter of 1 and a downlink RS index of 1, a value 01 corresponds to an open loop power control parameter of 2 and a downlink RS index of 2, a value 10 corresponds to an open loop power control parameter of 2 and a downlink RS index of 1, and a value 11 corresponds to an open loop power control parameter of 1 and a downlink RS index of 2. Therefore, the terminal device may obtain the corresponding open loop power control parameter or index of the downlink RS according to the value of the first SRI information. For example, when determining that the value of the first SRI information is 10, the terminal device may determine the corresponding open loop power control parameter to be 2 and the downlink RS index to be 1, and may further perform power control according to the open loop power control parameter of 2 and the downlink RS index of 1.

In at least one embodiment, the network device may directly configure the open loop power control parameter or index of the downlink RS associated with the first SRI information. In this case, reconfiguration of the first open loop power control parameter may refer to that the terminal device detects that the network device reconfigures the open loop power control parameter associated with the first SRI information through the first high-layer signaling. For example, the first SRI information is originally associated with the open loop power control parameter of 1, and the network device reconfigures the first SRI information to be associated with the open loop power control parameter of 2. In such a case, the terminal device may reset the first closed loop adjustment factor associated with the first SRI information, and the terminal device may further determine the transmit power for the PUSCH according to the reset first closed loop adjustment factor. Therefore, accuracy of the power control may be improved.

In at least one embodiment, the network device may pre-configure indexes (for example, j in the formula) corresponding to open loop power control parameters (for example, $P_{O\_PUSCH,f,c}(i)$ or $\alpha_{f,c}(j)$), i.e., a correspondence (recorded as a first correspondence) between the open loop power control parameters and the indexes. For example, the network device may configure $P_{O\_PUSCH,f,c}(i)$ or $\alpha_{f,c}(j)$ corresponding to different values of j. The network device may further configure a correspondence (recorded as a second correspondence) between the indexes of the open loop power control parameters and SRI information. Then, the terminal device may determine the index of the open loop power control parameter according to the first SRI information and the second correspondence, and may further determine the open loop power control parameter corresponding to the index of the open loop power control parameter according to the index of the open loop power control parameter and the first correspondence. Under such a condition, reconfiguration of the first open loop power control parameter associated with the first SRI information may refer to that the terminal device detects that the network device reconfigures the index of the open loop power control parameter corresponding to the first SRI information (i.e., reconfiguring the second correspondence) through the first high-layer signaling, or, reconfigures the open loop power control parameter corresponding to the index of the open loop power control parameter (i.e., reconfiguring the first correspondence).

Similarly, the network device may further pre-configure a correspondence (recorded as a third correspondence) between multiple downlink RSs and corresponding indexes of the downlink RSs (for example, $q_d$) for the terminal device through the first high-layer signaling. The network device may further configure a correspondence (recorded as a fourth correspondence) between SRI information and the indexes of the downlink RSs. Therefore, the terminal device may determine the index of the objective downlink RS according to the first RSI information and the fourth correspondence and then determine the objective downlink RS associated with the first SRI information according to the index of the objective downlink RS and the third correspondence. Under such a condition, reconfiguration of the first downlink RS associated with the first SRI information may refer to that the network device reconfigures the index of the downlink RS associated with the first SRI information (i.e., reconfiguring the fourth correspondence) through the first high-layer signaling, or, the network device reconfigures the downlink RS corresponding to the index of the downlink RS (which can be understood that the third correspondence changes). For example, the network device originally configures the first SRI information to be associated with a downlink RS index of 0, and the network device reconfigures the first SRI information to be associated with a downlink RS index of 1; or, the network device originally configures the downlink RS index of 0 to be associated with a CSI-RS0, and the network device reconfigures the downlink RS index of 0 to be associated with a CSI-RS1.

In at least one embodiment, the method 200 may further include the following operations.

The terminal device receives second high-layer signaling sent by the network device. The second high-layer signaling is configured to configure open loop power control parameters or indexes of downlink RSs corresponding to a plurality of SRI information on each Bandwidth Part (BWP) of the terminal device.

The terminal device determines the first open loop power control parameter associated with the first SRI information or the first downlink RS associated with the first SRI information according to a correspondence on a BWP transmitting the PUSCH.

That is, the network device may configure the open loop power control parameters or indexes of the downlink RSs corresponding to the plurality of SRI information (recorded as a fifth correspondence) on each BWP through the second high-layer signaling. That is, there is a fifth correspondence on each BWP. Therefore, the terminal device may determine the first open loop power control parameter associated with the first information or the first downlink RS associated with the first SRI information according to the fifth correspondence on the BWP transmitting the PUSCH.

In at least one embodiment, the first high-layer signaling and the second high-layer signaling may be the same high-layer signaling or different high-layer signaling. There are no limits made thereto in the embodiment of the disclosure.

It is to be understood that, in the embodiment of the disclosure, when the first open loop power control parameter or first downlink RS corresponding to the first SRI information is reconfigured, if the terminal device still adjusts the transmit power after reconfiguration based on the first closed loop adjustment factor obtained before reconfiguration, the accuracy of the power control may be reduced. Under such a condition, the terminal device may reset the first closed loop adjustment factor corresponding to the first SRI information and re-perform closed loop accumulation adjustment on the transmit power, so as to implement power control according to the reset first closed loop adjustment factor. Therefore, the accuracy of the power control may be improved.

It is to be noted that, in the embodiment of the disclosure, the first closed loop adjustment factor corresponding to the first SRI information may correspond to $f_c(i,l)$. The operation of resetting the first closed loop adjustment factor associated with the first SRI information may include resetting a historical value of the first closed loop adjustment factor, for example, resetting $f_{f,c}(i-1,l)$, or resetting a present value of the first closed loop adjustment factor, for example, resetting $f_{f,c}(i,l)$.

It is to be understood that, in the embodiment of the disclosure, when the power control parameter or downlink RS associated with the first SRI information is reconfigured, the terminal device only reconfigures the first closed loop adjustment factor associated with the first SRI information, i.e., only resetting the first closed loop adjustment factor associated with the first SRI information, and closed loop adjustment factors associated with other SRI information are not required to be adjusted. For example, it is not required to reset a second closed loop adjustment factor associated with the second SRI information.

In at least one embodiment of the disclosure, the method 200 may further include the following operation.

The terminal device determines the first closed loop adjustment factor in a closed loop control process associated with the first SRI information according to the closed loop power control process.

Specifically, the network device may further pre-configure a value of an index (for example, l in the formula) of the closed loop power control process associated with the first SRI information. Therefore, the terminal device may determine a value of the corresponding closed loop adjustment factor (for example, $f_{f,c}(i,l)$ in the formula) according to the index of the closed loop power control process, and may further determine the value as the first closed loop adjustment factor associated with the first SRI information. When the open loop power control parameter or downlink RS associated with the first SRI information is reconfigured, the terminal device may reset the first closed loop adjustment factor and, for example, may reset the historical value (for example, $f_{f,c}(i-1,l)$) or present value (for example, $f_{f,c}(i,l)$) of the first closed loop adjustment factor associated with the first SRI information.

Particularly, in the embodiment of the disclosure, the operation in S210 may specifically include the following action.

When an accumulation mode is enabled for closed loop power control of the PUSCH, the terminal device resets the first closed loop adjustment factor.

It is to be understood that, in the embodiment of the disclosure, the accumulation mode may be for all closed loop power control processes. Under such a condition, the terminal device may reset the first closed loop adjustment factor corresponding to the first SRI information when the open loop power control parameter or downlink RS associated with the first SRI information is reconfigured and the accumulation mode is enabled for a closed loop power control process. Alternatively, the network device may also configure a corresponding accumulation mode for respective closed loop power control processes. In such a case, the terminal device may reset the first closed loop adjustment factor corresponding to the first SRI information when the open loop power control parameter or downlink RS associated with the first SRI information is reconfigured and the accumulation mode is enabled for the closed loop power control process corresponding to the first SRI information.

It is also to be understood that, during specific implementation, the terminal device may also reset the first closed loop adjustment factor when the accumulation mode is enabled for closed loop power control on the BWP transmitting the PUSCH.

In at least one embodiment, the terminal device may calculate the transmit power of the PUSCH in combination with the abovementioned formula according to the reset first power adjustment factor. Specifically, the first closed loop adjustment factor may be added to the transmit power obtained according to the open loop power control parameter, thereby obtaining the transmit power of the PUSCH, which will not be elaborated herein.

In at least one embodiment, the operation in S220 may specifically include the following actions.

The terminal device determines an updated first closed loop adjustment factor according to the reset first closed loop adjustment factor and a latest received Transmit Power Control (TPC) command.

The terminal device determines the transmit power of the PUSCH according to the updated first closed loop adjustment factor.

Specifically, the terminal device determines the updated first closed loop adjustment factor according to the reset first closed loop adjustment factor and the latest received TPC command, and the terminal device may further determine the transmit power of the PUSCH according to the updated first closed loop adjustment factor. In such a case, the first closed loop adjustment factor $f_{f,c}(i,l)$ for closed loop power control for which the accumulation mode is enabled may be represented as $f_{f,c}(i,l)=\delta_{PUSCH,f,c}(i-K_{PUSCH},l)$, where $\delta_{PUSCH,f,c}(i-K_{PUSCH},l)$ is an adjusted value indicated by the TPC command. That is, the terminal device directly resets the previous first closed loop adjustment factor, i.e., $f_{f,c}(i-1,l)=0$.

It is to be understood that, in the embodiment of the disclosure, the TPC command may be indicated to the terminal device through the DCI. For example, the TPC command may be indicated to the terminal device through a TPC indication field in the DCI for scheduling the PUSCH. That is, the terminal device may obtain the adjusted value of the closed loop power configured by the network device through the TPC indication field in the DCI, i.e., $\delta_{PUSCH,f,c}(i-K_{PUSCH},1)$.

In at least one embodiment, the method 200 may further include the following operation.

The terminal device sends the PUSCH according to the determined transmit power.

That is, the transmit power determined by the terminal device may be configured to send the PUSCH. In at least one embodiment, the transmit power may also not be configured to send the PUSCH. For example, the terminal device may calculate a Power Headroom Report (PHR) of the present PUSCH according to the determined transmit power and then report the PHR to the network device, or may also calculate transmit power for another uplink signal according to the determined transmit power. For example, the terminal device may determine a power value obtained by adding a certain offset value to the determined transmit power as transmit power for an SRS and the like. An application scenario of the transmit power is not limited in the embodiment of the disclosure.

The power control method in the embodiment of the disclosure is described above in combination with FIG. 2 in detail from the angle of the terminal device. A power control method in another embodiment of the disclosure will be described below in combination with FIG. 3 in detail from the angle of the network device. It is to be understood that descriptions made on a network device side correspond to descriptions made on a terminal device side and similar descriptions may refer to the above, which will not be elaborated herein for avoiding repetitions.

FIG. 3 is a schematic block diagram of a power control method 300 according to an embodiment of the disclosure. As illustrated in FIG. 3, the method 300 includes part or all of the following contents.

In S310, a network device resets a first closed loop adjustment factor associated with first SRI information after a first open loop power control parameter associated with the first SRI information or a first downlink RS associated with the first SRI information is reconfigured, the first open loop power control parameter being configured for power control of a PUSCH and the first downlink RS being configured to measure a path loss value for power control of the PUSCH.

In at least one embodiment, the first SRI information is included in DCI for scheduling the PUSCH.

In at least one embodiment, the method 300 may further include the following operation.

The network device sends first high-layer signaling to a terminal device. The first high-layer signaling is configured to configure open loop power control parameters or indexes of downlink RSs associated with a plurality of SRI information. The plurality of SRI information includes the first SRI information, the open loop power control parameters include the first open loop power control parameter and the indexes of the downlink RSs include an index of the first downlink RS.

In at least one embodiment, the first open loop power control parameter is objective received power or a path loss factor.

In at least one embodiment, the first downlink RS is a downlink SSB or a CSI-RS.

In at least one embodiment, the method 300 may further include the following operation.

The network device determines the first closed loop adjustment factor in a closed loop control process associated with the first SRI information according to the closed loop power control process.

In at least one embodiment, the operation that the first closed loop adjustment factor associated with the first SRI information is reset includes the following action.

When an accumulation mode is enabled for closed loop power control of the PUSCH, the network device resets the first closed loop adjustment factor.

In at least one embodiment, the method 300 may further include the following action.

The network device determines a subsequent TPC command according to the reset first closed loop adjustment factor.

The method embodiments of the disclosure are described above in combination with FIG. 2 to FIG. 3 in detail and device embodiments of the disclosure will be described below in combination with FIG. 4 to FIG. 7 in detail. It is to be understood that the device embodiments correspond to the method embodiments and similar descriptions may refer to the method embodiments.

Figure 4:
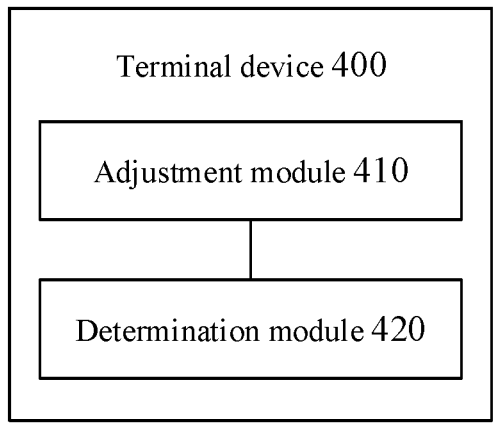
FIG. 4 is a schematic block diagram of a terminal device according to an embodiment of the disclosure.

FIG. 4 is a schematic block diagram of a terminal device according to an embodiment of the disclosure. The terminal device 400 includes an adjustment module 410 and a determination module 420.

The adjustment module 410 is configured to reset a first closed loop adjustment factor associated with first SRI information in condition that a first open loop power control parameter associated with the first SRI information or a first downlink RS associated with the first SRI information is reconfigured. The first open loop power control parameter is configured for power control of a PUSCH and the first downlink RS is configured to measure a path loss value for power control of the PUSCH.

The determination module 420 is configured to determine transmit power of the PUSCH according to the reset first closed loop adjustment factor.

The terminal device 400 may further include a communication module. In at least one embodiment, the communication module may be configured to receive first high-layer signaling sent by a network device. The first high-layer signaling is configured to configure open loop power control parameters or indexes of downlink RSs associated with a plurality of SRI information, the plurality of SRI information includes the first SRI information, the open loop power control parameters include the first open loop power control parameter and the indexes of the downlink RSs include an index of the first downlink RS.

In at least one embodiment, the communication module may be configured to receive second high-layer signaling sent by the network device. The second high-layer signaling is configured to configure open loop power control parameters or indexes of downlink RSs corresponding to a plurality of SRI information on each BWP of the terminal device.

Specifically, the terminal device 400 may correspond to (for example, the terminal device may be configured in or may be) the terminal device described in the method 200. Each module or unit in the terminal device 400 is configured to execute each operation or processing process executed by the terminal device in the method 200. For avoiding elaborations, detailed descriptions will be omitted herein.

Figure 5:
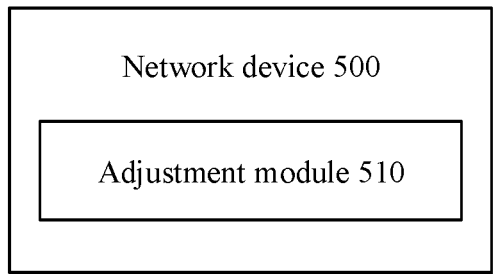
FIG. 5 is a schematic block diagram of a network device according to an embodiment of the disclosure.

FIG. 5 is a schematic block diagram of a network device according to an embodiment of the disclosure. The network device 500 includes an adjustment module 510.

The adjustment module 510 is configured to reset a first closed loop adjustment factor associated with first SRI information after a first open loop power control parameter associated with the first SRI information or a first downlink RS associated with the first SRI information is reconfigured.

The first open loop power control parameter is configured for power control of a PUSCH and the first downlink RS is configured to measure a path loss value for power control of the PUSCH.

The network device 500 further includes a communication module. In at least one embodiment, the communication module may be configured to send first high-layer signaling to a terminal device. The first high-layer signaling is configured to configure open loop power control parameters or indexes of downlink RSs associated with a plurality of SRI information, the plurality of SRI information includes the first SRI information, the open loop power control parameters include the first open loop power control parameter and the indexes of the downlink RSs include an index of the first downlink RS.

In at least one embodiment, the communication module may be configured to send second high-layer signaling to the terminal device. The second high-layer signaling is configured to configure open loop power control parameters or indexes of downlink RSs corresponding to a plurality of SRI information on each BWP of the terminal device.

Specifically, the network device 500 may correspond to (for example, the network device may be configured in or may be) the network device described in the method 300. Each module or unit in the network device 500 is configured to execute each operation or processing process executed by the network device in the method 300. For avoiding elaborations, detailed descriptions will be omitted herein.

Figure 6:
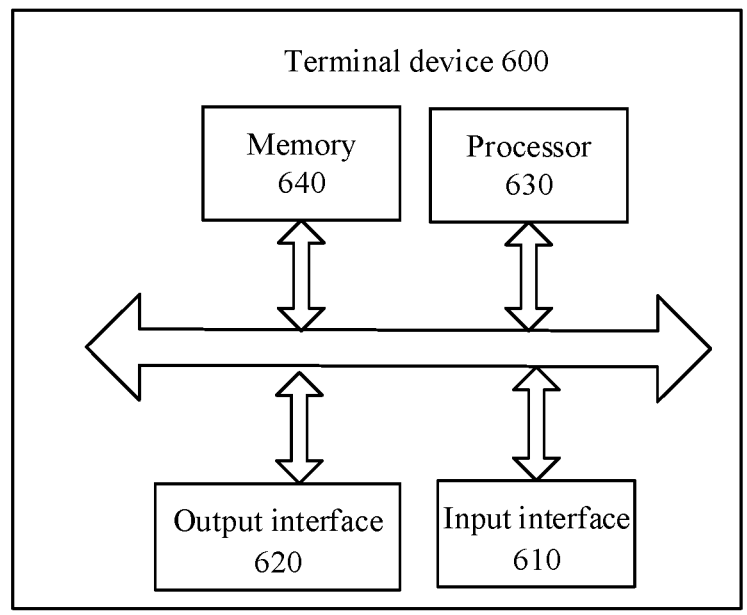
FIG. 6 is another schematic block diagram of a terminal device according to an embodiment of the disclosure.

As illustrated in FIG. 6, an embodiment of the disclosure also provides a terminal device 600. The terminal device 600 may be the terminal device 400 in FIG. 4, and may be configured to execute operations of the terminal device corresponding to the method 200 in FIG. 2. The terminal device 600 includes an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program instruction or code in the memory 640 to control the input interface 610 to receive a signal, control the output interface 620 to send a signal and complete operations in the method embodiments.

It is to be understood that in the embodiment of the disclosure, the processor 630 may be a Central Processing Unit (CPU) and the processor 630 may also be another universal processor, a Digital Signal Processor (DSP), an Application Specific Integrated Circuit (ASIC), a Field Programmable Gate Array (FPGA) or another programmable logic device, discrete gate or transistor logic device, discrete hardware component and the like. The universal processor may be a microprocessor or the processor may also be any conventional processor and the like.

The memory 640 may include a Read-Only Memory (ROM) and a Random Access Memory (RAM) and provides instructions and data to the processor 630. A part of the memory 640 may further include a nonvolatile RAM. For example, the memory 640 may further store information of a device type.

In an implementation process, each operation of the above method may be completed by an integrated logic circuit of hardware in the processor 630 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory 640. The processor 630 reads information in the memory 640 and completes the operations of the method in combination with hardware. No more detailed descriptions will be made herein to avoid repetitions.

In a specific implementation mode, the adjustment module 410 and the determination module 420 in the terminal device 400 may be implemented by the processor 630 in FIG. 6, and the communication module in the terminal device 400 may be implemented by the output interface 620 and the input interface 610 in FIG. 6.

Figure 7:
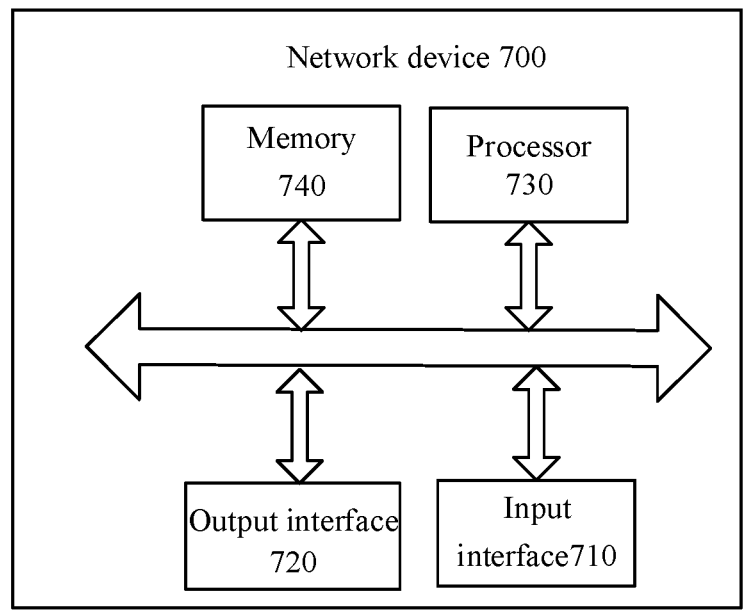
FIG. 7 is another schematic block diagram of a network device according to an embodiment of the disclosure.

As illustrated in FIG. 7, an embodiment of the disclosure also provides a network device 700. The network device 700 may be the network device 500 in FIG. 5, and may be configured to execute operations of the network device corresponding to the method 300 in FIG. 3. The network device 700 includes an input interface 710, an output interface 720, a processor 730 and a memory 740. The input interface 710, the output interface 720, the processor 730 and the memory 740 may be connected through a bus system. The memory 740 is configured to store a program, an instruction or a code. The processor 730 is configured to execute the program instruction or code in the memory 740 to control the input interface 710 to receive a signal, control the output interface 720 to send a signal and complete operations in the method embodiments.

It is to be understood that in the embodiment of the disclosure, the processor 730 may be a CPU and the processor 730 may also be another universal processor, a DSP, an ASIC, an FPGA or another programmable logic device, discrete gate or transistor logic device, discrete hardware component and the like. The universal processor may be a microprocessor or the processor may also be any conventional processor and the like.

The memory 740 may include a ROM and a RAM and provides instructions and data to the processor 730. A part of the memory 740 may further include a nonvolatile RAM. For example, the memory 740 may further store information of a device type.

In an implementation process, each operation of the method may be completed by an integrated logic circuit of hardware in the processor 730 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a PROM or EEPROM and a register. The storage medium is located in the memory 740. The processor 730 reads information in the memory 740 and completes the operations of the method in combination with hardware. No more detailed descriptions will be made herein to avoid repetitions.

In a specific implementation mode, the adjustment module 510 in the network device 500 may be implemented by the processor 730 in FIG. 7, and the communication module in the network device 500 may be implemented by the input interface 710 and the output interface 720 in FIG. 7.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A power control method, comprising:
obtaining, by a terminal device, a first correspondence between Sounding Reference Signal Resource Indicator (SRI) values and values of index j of open loop power control parameters and a second correspondence between the SRI values and values of index l of closed loop power control processes;
when a first open loop power control parameter, in the open loop power control parameters and corresponding to a value in the values of index j, is reconfigured by a high-layer signaling, resetting, by the terminal device, a first closed loop adjustment factor of a first closed loop power control process in the closed loop power control processes with a value in the values of index l, wherein a value of the index j corresponding to the first open loop power control parameter is associated with a SRI value according to the first correspondence, and a value of index l of the first closed loop power control process is associated with the SRI value according to the second correspondence; and
determining, by the terminal device, transmit power of the PUSCH according to the reset first closed loop adjustment factor;
wherein obtaining, by the terminal device, the first correspondence between SRI values and values of index j of open loop power control parameters comprises:
obtaining, by the terminal device, the first correspondences on each Bandwidth Part (BWP) of the terminal device.

2. The method of claim 1, wherein the SRI value is indicated by an SRI indication field in Downlink Control Information (DCI) for scheduling the PUSCH.

3. The method of claim 1, wherein obtaining, by the terminal device, the first correspondence between SRI values and values of index j of open loop power control parameters further comprises:
obtaining, by the terminal device, the first correspondence on a BWP for transmitting the PUSCH.

4. The method of claim 1, wherein the first open loop power control parameter is objective received power or a path loss factor.

5. The method of claim 1, wherein resetting, by the terminal device, the first closed loop adjustment factor of the first closed loop power control process in the closed loop power control processes with the value in the values of index l comprises:
in condition that an accumulation mode is enabled for closed loop power control of the PUSCH, resetting, by the terminal device, the first closed loop adjustment factor.

6. The method of claim 1, further comprising:
sending, by the terminal device, the PUSCH according to the determined transmit power.

7. A terminal device, comprising a processor, wherein the processor is configured to:
obtain a first correspondence between Sounding Reference Signal Resource Indicator (SRI) values and values of index j of open loop power control parameters and a second correspondence between the SRI values and values of index l of closed loop power control processes;
when a first open loop power control parameter, in the open loop power control parameters and corresponding to a value in the values of index j, is reconfigured by a high-layer signaling, reset a first closed loop adjustment factor of a first closed loop power control process in the closed loop power control processes with a value in the values of index l,
wherein a value of the index j corresponding to the first open loop power control parameter is associated with a SRI value according to the first correspondence, and a value of index l of the first closed loop power control process is associated with the SRI value according to the second correspondence; and determine transmit power of the PUSCH according to the reset first closed loop adjustment factor;

wherein the processor is further configured to:

obtain the first correspondence on each Bandwidth Part (BWP) of the terminal device.

8. The terminal device of claim 7, wherein the SRI value is indicated by an SRI indication field in Downlink Control Information (DCI) for scheduling the PUSCH.

9. The terminal device of claim 7, wherein the processor is further configured to:

obtain the first correspondence on a BWP for transmitting the PUSCH.

10. The terminal device of claim 7, wherein the first open loop power control parameter is objective received power or a path loss factor.

11. The terminal device of claim 7, wherein the processor is specifically configured to:

in condition that an accumulation mode is enabled for closed loop power control of the PUSCH, reset the first closed loop adjustment factor.

12. The terminal device of claim 7, wherein the processor is specifically configured to:

determine an updated first closed loop adjustment factor according to the reset first closed loop adjustment factor and a latest received Transmit Power Control (TPC) command; and determine the transmit power of the PUSCH according to the updated first closed loop adjustment factor.

13. The terminal device of claim 7, further comprising:

an interface, configured to send the PUSCH according to the determined transmit power.

14. A non-transitory computer-readable storage medium, comprising a computer-executable instruction that, when executed by a processor, causes the processor to execute a power control method, the method comprising:

obtaining a first correspondence between Sounding Reference Signal Resource Indicator (SRI) values and values of index j of open loop power control parameters and a second correspondence between the SRI values and values of index l of closed loop power control processes;

when a first open loop power control parameter, in the open loop power control parameters and corresponding to a value in the values of index j, is reconfigured by a high-layer signaling, resetting a first closed loop adjustment factor of a first closed loop power control process in the closed loop power control processes with a value in the values of index l, wherein a value of the index j corresponding to the first open loop power control parameter is associated with a SRI value according to the first correspondence, and a value of index l of the first closed loop power control process is associated with the SRI value according to the second correspondence; and determining transmit power of the PUSCH according to the reset first closed loop adjustment factor;

wherein obtaining, by the terminal device, the first correspondence between SRI values and values of index j of open loop power control parameters comprises:

obtaining, by the terminal device, the first correspondence on each Bandwidth Part (BWP) of the terminal device.

* * * * *